May 30, 1950 L. R. TALLMAN 2,509,996
COLLAPSIBLE FEEDER HEAD FOR BALERS
Filed May 10, 1944 4 Sheets-Sheet 1
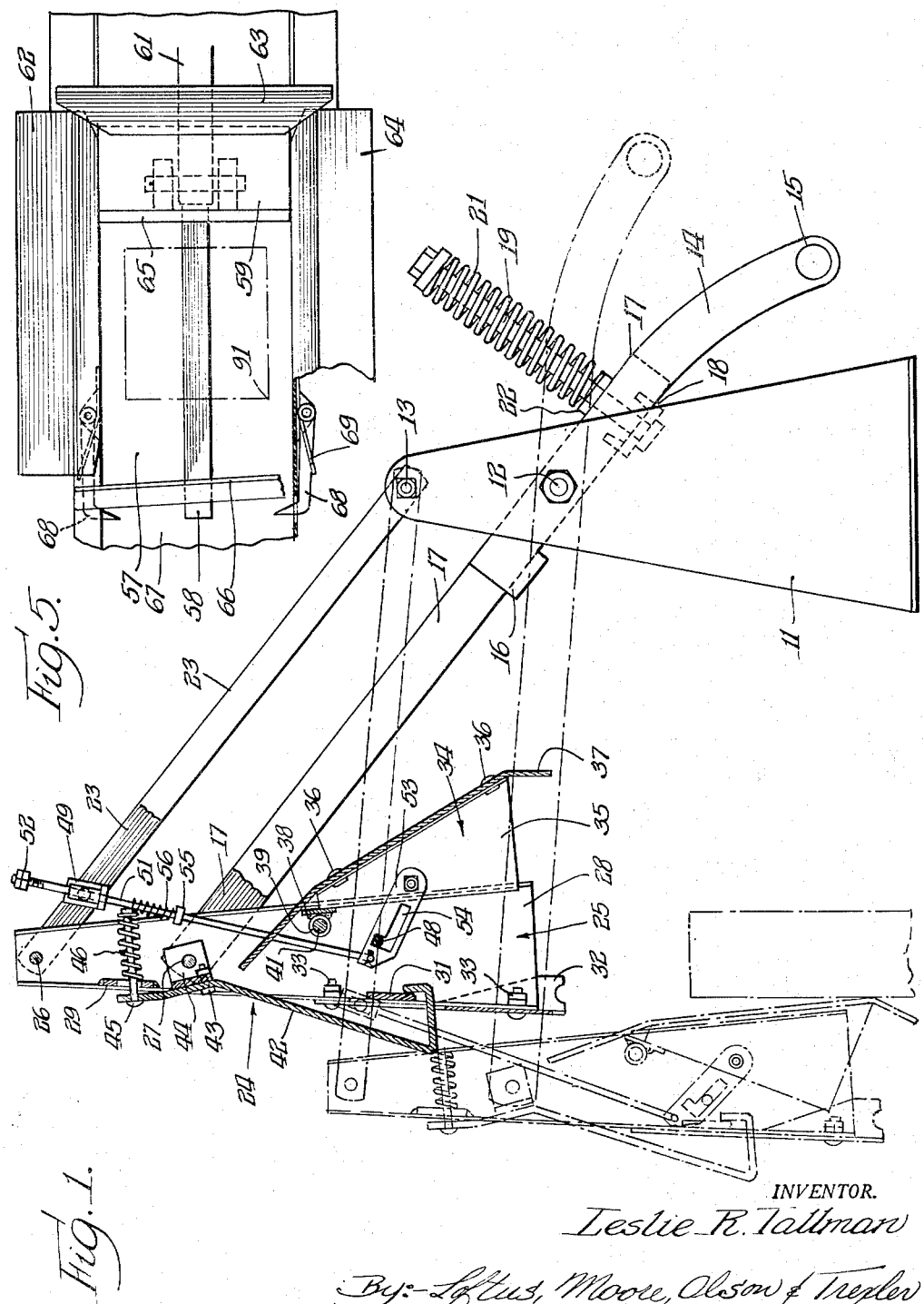
INVENTOR.
Leslie R. Tallman
By: Loftus, Moore, Olson & Trexler
Attys.

May 30, 1950 L. R. TALLMAN 2,509,996
COLLAPSIBLE FEEDER HEAD FOR BALERS
Filed May 10, 1944 4 Sheets-Sheet 2
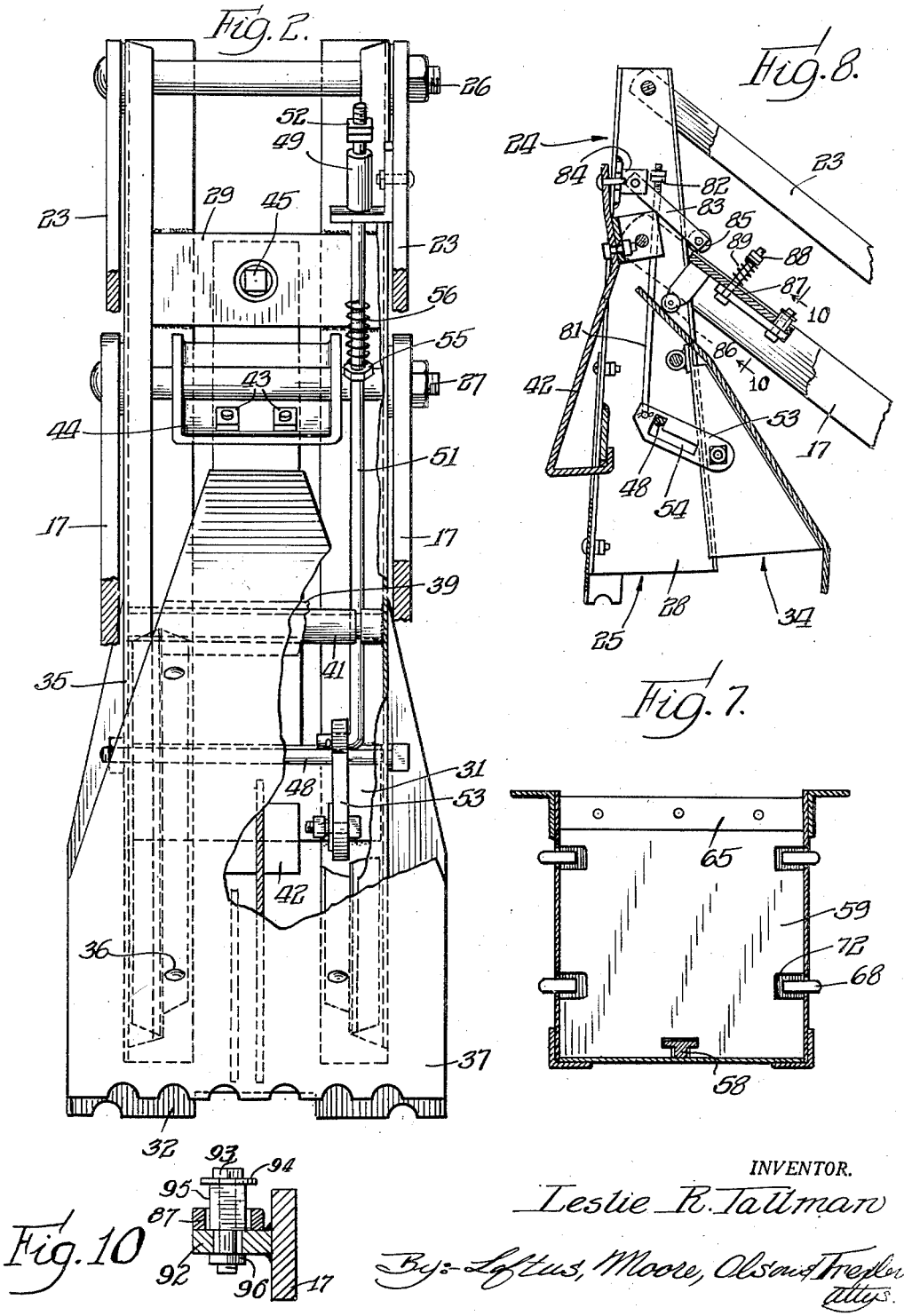
INVENTOR.
Leslie R. Tallman
By: Loftus, Moore, Olson & Trexler
Attys.

May 30, 1950     L. R. TALLMAN     2,509,996
COLLAPSIBLE FEEDER HEAD FOR BALERS
Filed May 10, 1944     4 Sheets-Sheet 3
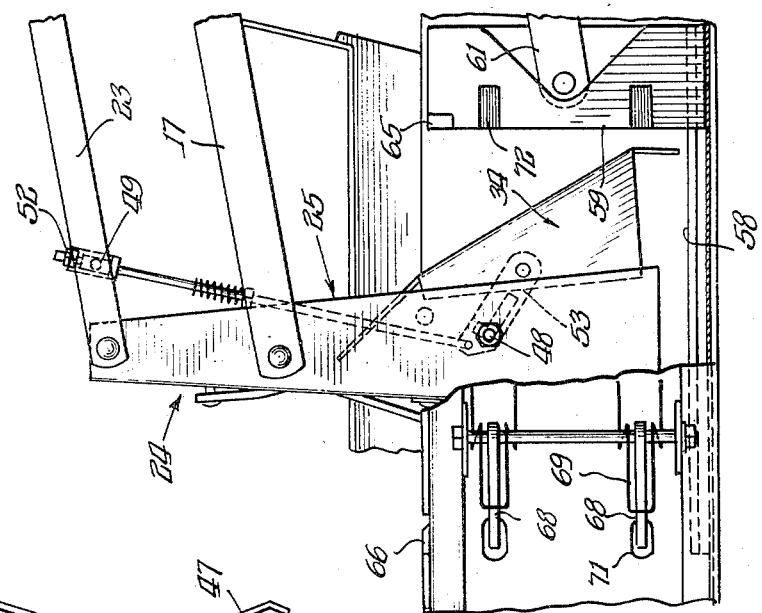
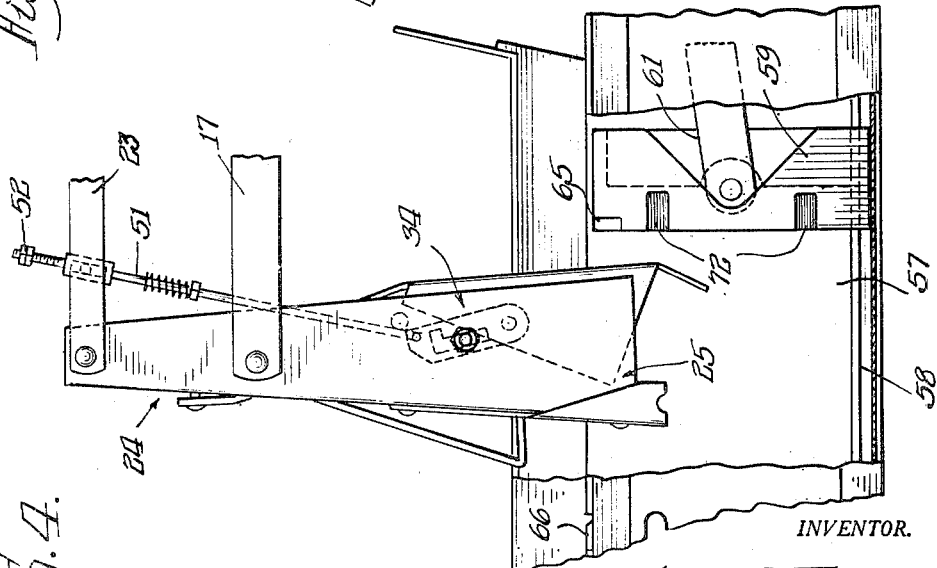
INVENTOR.
Leslie R. Tallman May 30, 1950 L. R. TALLMAN 2,509,996
COLLAPSIBLE FEEDER HEAD FOR BALERS
Filed May 10, 1944 4 Sheets-Sheet 4

INVENTOR.
Leslie L. Tallman
BY
Moore, Olson & Trexler
Attys.

Patented May 30, 1950

2,509,996

UNITED STATES PATENT OFFICE 2,509,996

COLLAPSIBLE FEEDER HEAD FOR BALERS

Leslie R. Tallman, Shelbyville, Ill., assignor of forty-five per cent to G. L. Tallman, twelve and one-half per cent to J. L. Tallman, and twelve and one-half per cent to Emma S. Tallman, all of Shelbyville, Ill.

Application May 10, 1944, Serial No. 534,869

11 Claims. (Cl. 100—25)

The present invention relates to a collapsible feeder head for balers, and more particularly to a collapsible feeder head of the type commonly used in an agricultural type of baler for baling hay, straw, and similar types of materials.

In balers of the agricultural type, either the hand fed or automatic pick-up balers, there has been provided a compression chamber into which the material is placed and a plunger operates to compress the material in the chamber and to move the compressed material forwardly to form a portion of a bale. The compression chamber is located adjacent a bale case in which the bale is being formed and each charge of compressed material is retained by a plurality of dogs extending through the sides of the bale case adjacent the compression chamber. The reciprocable plunger is actuated by a suitable pitman or connecting rod driven from suitable gearing to which power is supplied. Heretofore the same gearing has been connected to a pitman or lever arrangement having at the free end thereof a feeder head for forcing each charge of material such as straw or hay downwardly into the compression chamber. The cycle of operation of the feeder head is so related to the operation of the plunger that the forward motion of the plunger begins prior to the upward or withdrawing motion of the feeder head. The dimension of the feeder head in a direction parallel to the direction of the longitudinal axis of the compression chamber and the bale case therefore has been limited by the action of the plunger since the plunger moves an appreciable distance across the opening to the compression chamber prior to the time that the lowermost portion of the feeder head is raised above the top surface of the plunger. Therefore, it will be appreciated that heretofore the feeder head could only engage a certain portion of the charge of material such as hay, straw, soy beans, alfalfa, and the like. Particularly in the case of the longer fibered materials such as soy beans, the charge of material would not be segregated from the supply of material coming toward the compression chamber, particularly in the case of the automatic pick-up type of baler. Bales of such material have been found to be difficult to disentangle when it is desired to feed such material to livestock, and it has frequently been found necessary to disentangle or shake apart an appreciable portion of the bale in order to obtain but a few forks of material. It, therefore, would be highly desirable to overcome such disadvantages. If the feeder head could be arranged to engage a large area of material, the efficiency of the baler would be materially increased and each charge of material fed into the compression chamber would be folded over more neatly to become a portion of a bale. It furthermore would also be desirable to provide an arrangement whereby each charge is definitely and cleanly separated from a succeeding charge so that when use is to be made of the bale, the individual charges are readily separable when a bale is opened for use.

In accordance with the present invention many of the disadvantages heretofore inherent in balers of the type described are overcome by providing a collapsible feeder head which during the downward portion of the cycle of operation would have a maximum area of engagement with a charge of material and which during the remaining cycle of operation or during its upward movement could have a much smaller volume of displacement. In accordance with the present invention, the plunger is guided by guide means located adjacent the bottom of the compression chamber as compared to prior arrangements whereby the plunger was guided by means located adjacent the upper extremity of the plunger which means extended into the compression chamber so as to reduce the area of the opening to such chamber. The feeder head is formed in a plurality of sections which are collapsible so that during the upward movement of the feeder head during that time when the plunger is moving forwardly, the feeder head does not occupy any greater space or volume than the old type of non-collapsible feeder head heretofore employed. During the feeding or downward stroke of the feeder head a much greater surface is engaged by the feeder head so as to increase the volume of the material supplied to the compression chamber as a charge.

It, therefore, is an object of the present invention to provide in a baler an improved collapsible feeder head.

It is another object of the present invention to provide in a baler the combination of a collapsible feeder head and a compression chamber so arranged that the operation of the plunger of the compression chamber and the feeder head are correlated to provide an improved type of operation.

A still further object of the present invention is to provide a collapsible feeder head for balers having means for holding the head in expanded position for a predetermined portion of each cycle of operation of the feeder head.

Still another object of the present invention is to provide in a baler a collapsible feeder head constructed in a plurality of sections provided with latching means for holding the sections in expanded condition for a predetermined portion of each cycle of movement of the feeder head and for unlatching the sections at a predetermined time in said cycle of operation.

Other and further objects of the present invention subsequently will become apparent by reference to the following description taken in connection with the accompanying drawing wherein Figure 1 is a side elevation of a baler feeder head constructed in accordance with the present invention and wherein the dotted line representation is explanatory of the operation of the feeder head mechanism;

Figure 2 is a back view, partially broken away, of the feeder head;

Figures 3, 4, and 5 are views of a generally schematic nature to illustrate the mode of operation of the feeder head shown in Figures 1 and 2;

Figure 6 is a perspective view of one part of the feeder head;

Figure 7 is a front view of the plunger head as seen from a cross section of the baler in the proximity of the junction between the compression chamber and the bale case;

Figure 8 illustrates another manner in which the collapsible feeder head may be constructed and operated;

Figure 10 is a cross sectional view in the direction of the arrows along the line 10—10 of Figure 8.

Figure 9:
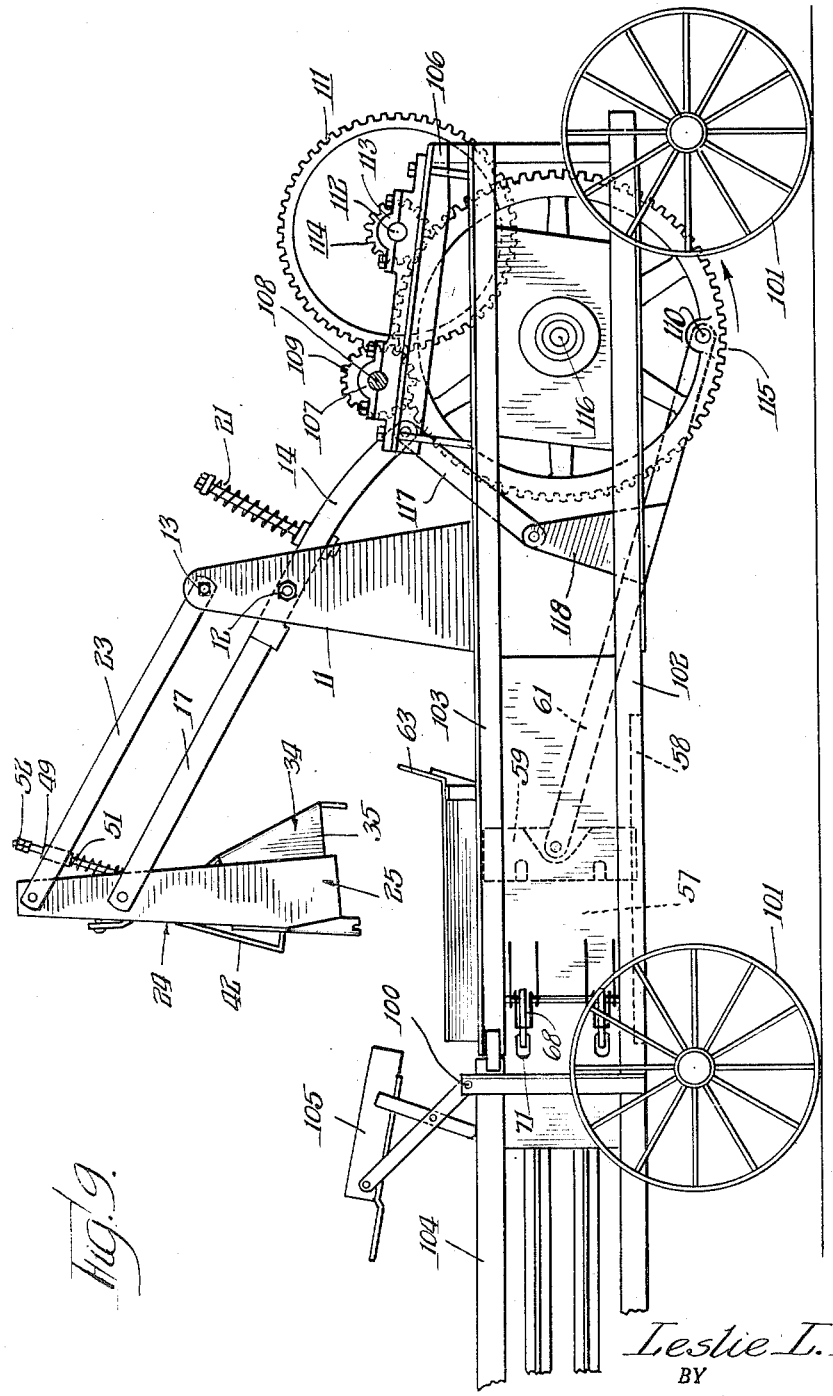
Figure 9 illustrates the relation of the invention to the common type of baler.

An agricultural type of baler is usually constructed so as to have a generally rectangular frame made or fabricated of a plurality of angle iron members. One portion of such frame is arranged to support a plurality of gears and crank shafts which are connected to suitable pitmans, connecting rods, or levers so as to actuate a feeder head and a compression plunger. The frame of the baler is provided with a portion enclosed at the bottom and sides to form a compression chamber which is to receive the material to be baled. The compression chamber feeds compressed material into a bale case in which the bale is formed. In baling operations the more common method of forming bales is to utilize separation blocks and hence it will simplify the explanation which is to follow to assume that the present invention is being applied to that type of baler utilizing separation blocks although it is to be understood that the present invention is equally applicable to other types of balers which do not use separation blocks. In the type of baler referred to the frame has positioned on the upper side a pair of upright support members 11 such as shown in Figure 1. The pair of members 11 are interconnected by a plurality of shaft members 12 and 13 upon which suitable levers or pitmans are mounted. On the lower shaft member 12 a pair of levers 14 are mounted each having adjacent one end an opening 15 adapted to be connected to a lever which is connected to a crank shaft associated with the gear mechanism mounted to the right of the upright supports 11. The levers 14 extend a short distance beyond the pivoted point 12 where they terminate in portions having depending side members 16. Mounted adjacent the levers 14 and on the shaft 12 are a pair of levers 17 which extend upwardly to a feeder head and which extend downwardly in Figure 1 a short distance beyond the shaft 12. Adjacent the lower ends of the lever 17 there is positioned a cross member 18 engaged by a bolt 19 having thereabout a helical spring 21 which in turn engages another cross member 22. The cross members 18 and 22 are arranged to engage both pairs of levers 14 and 17 and the resilient spring 21 about the bolt 19 provides a resilient means for interconnecting the two pairs of levers. This resilient interconnecting means is provided so that if during the downward stroke of the feeder head obstruction is encountered, the resilient interconnection comprising a spring 21 will prevent breakage of the mechanism. Mounted on the shaft 13 located at the upper extremity of the upright members 11 are a pair of levers 23 arranged so as to be generally parallel to the levers 17. The pairs of levers 17 and 23 are connected to a collapsible feeder head indicated by the reference character 24.

The collapsible feeder head 24 is formed of a plurality of sections so that during a portion of the cycle of operation of the feeder head a large area of a charge of material supplied to a compression chamber in a baler may be engaged, and subsequently during another portion of the cycle of operation the feeder head will occupy a minimum of space or volume. One manner of constructing the feeder head 24 is illustrated in Figures 1 and 2. One section 25 of the feeder head 24 is connected adjacent its upper extremity to the pair of levers 23 by a rod or shaft member 26 and interconnected at an intermediate point by a rod or shaft member 27 to the outer extremities of the pair of levers 17. The section 25 is formed of two similar side members 28 connected to a plurality of cross members. One of these cross members comprises the bar 29 which is welded to each of the side members 28 and another cross member 31 also is welded to each of the side members 28. Secured to the forward surface of the flanges of the side members 28 is a material engaging member 32 secured to the side flanges by a plurality of bolts 33. The second section 34 of the feeder head 24 is formed of two trapezoidal side members 35 secured by rivets 36 to a rear face member 37. The side members 35 at their inner edges are flanged and extending between the flanged portions is a bar 38 which is welded to a sleeve 39 surrounding a shaft 41 which shaft is mounted on the first section 25 of the feeder head 24.

Where the feeder head 24 is used in a baler of the type having separation blocks for the formation of bales, a block engaging member 42 is provided which is secured by suitable fastening means such as bolts 43 to a bracket 44 pivotally mounted on the shaft 27. Adjacent the upper extremity of the block engaging member 42 there is provided a suitable aperture through which is mounted the bolt 45 which in turn is surrounded by a resilient spring 46 bearing against the cross plate 29. The lower extremity of the member 42 is bent inwardly and upwardly so that the upwardly turned edge may engage the cross member 31 of the feeder head section 25. The general configuration of the member 42 will be better appreciated by reference to Figure 6 which shows that the lower edge 47 may be notched and flared outwardly so that the outwardly flared portions may also serve to engage the material such as hay or straw during those cycles of the operation of the feeder head when the member 42 is not being utilized to position a separation block.

The two sections 25 and 34 of the feeder head 24 are arranged to be latched in expanded position shown in full lines in Figure 1 by a mechanism which includes a shaft or rod 48 extending between the sides 28 of the section 25, and a mechanism interconnecting the section 34 and one of the pair of levers 23. This mechanism includes a sleeve bearing member 49 pivotally mounted on one lever 23 a short distance from the outer extremity which engages the shaft 26. The pivoted sleeve bearing member 49 is engaged by a rod 51 having at its upper extremity a pair of lock nuts 52 and being connected at its lower extremity to a locking member 53. The locking member 53 is pivotally secured to one of the side members 35 of the section 34, and the locking member has a slot and notch 54 in which the shaft 48 is permitted to operate. The rod 51 at an intermediate point is provided with a stop nut or collar 55 above which is positioned a cushioning spring 56.

Before explaining the operation of the feeder head 24, it may be desirable to refer to certain other apparatus of the baler with which the feeder head must cooperate. By referring to Figures 3, 4, and 5, it will be seen that a material compression chamber 57 is provided adjacent its bottom with a guide member 58 which as may be seen from Figure 7 has a generally T-shaped cross sectional configuration. A compression member or plunger 59 is connected by a pitman 61 to the same gearing which is arranged to operate the levers 14 shown in Figure 1. The compression chamber 57 is provided adjacent its upper extremity with suitable flared side members 62, 63, and 64 which assist the passage of material into the compression chamber. The plunger 59 is provided adjacent its upper foremost corner extremity with a shear bar 65 arranged to cooperate with another shear bar or knife 66 which preferably is mounted at a slight angle to a line perpendicular to the transverse axis of the baling chamber and bale case. From Figures 3 and 5 it will be seen that each side of the baler, adjacent that portion which interconnects the compression chamber 57 with the bale case 67, is provided with a plurality of dogs 68. Each of the dogs 68 is resiliently biased by a spring 69 so that the pointed portions of the dogs extend inwardly into the bale case through suitable openings or apertures 71. It will be seen that the guide rail 58 mounted in the bottom of the compression chamber 57 terminates in the vicinity of the line interconnecting the extremities of the dogs 68 so that the end of the rail 58 cooperates with the dogs 68 to retain in position compressed charges of material. The compression plunger 59 moves forwardly so that the cutter bar 65 passes underneath the cooperating cutting bar or knife 66, and hence it will be seen that the forward face of the plunger 59 extends just beyond the extremities of the dogs 68. To provide for such passage of the plunger 59 to this point, the plunger is provided on each side with suitable recesses 72. The features of the compression chamber as illustrated in Figures 3, 5, 7 and 9 are claimed in my divisional patent application for Balers, Serial Number 648,470 filed February 18, 1946, patented November 23, 1948, No. 2,454,413.

It may now be assumed that the collapsible feeder head 24 has been latched into its expanded position as shown in Figure 1 and is now being moved downwardly toward the compression chamber 57 of the baler so as to engage a charge of material which is to be forced into the compression chamber for compression by the plunger 59. When the feeder head 24 has been moved downwardly to a position approximately corresponding to that shown in Figure 3, the upper lock nuts 52 on the rod 51 will engage the upper extremity of the pivoted sleeve member 49 so as to pivot the lock member 53 and to disengage the notch from the shaft 48 so that the shaft 48 may now travel in the slideway portion of the aperture 54. The lock nuts 52 may be adjusted so that the unlatching operation just described occurs slightly before the collapsible feeder head 24 has reached its lowermost position in the compression chamber 57 thereby to obviate the possibility of any detrimental pressure being applied to the section 34 of the feeder head 24 by virtue of compressed material between that section and the forward face of the plunger 59. The levers 17 and 23 now move the collapsible head 24 upwardly so that at a certain point in the upward travel of the head 24, the section 34 may assume a position such as shown in Figure 4. The levers 23 and 17 continue their upward movement to a point which may be assumed to be somewhat higher than that shown in Figure 1, at least for purposes of explanation of the parts as shown, until the resilient spring 56 engages the lowermost side of the pivotally mounted sleeve bearing member 49. At the maximum upward movement of the levers 23 and 17, there is a reversal of the direction of the movement of these levers so that the action of the spring 56 being compressed against the lowermost portion of the bearing member 49 is augmented by the inertia acting upon the section 34 so that this section is moved outwardly to the expanded position whereupon the rod 48 engages the notch in the locking member 53. It will be appreciated that while the baler is operating at a steady speed the inertia stored in the member 34 may be sufficient to move this member to expanded position without the action of the spring 56, but it is deemed desirable to provide the collar 55 and the spring 56 to insure positive locking operation of the feeder head 24 in expanded position. The lock nuts 52 on the rod 51 of the locking mechanism may be so adjusted that the unlatching operation takes place shortly after the lower extremities of the members 32 and 37 are in the proximity of the upper edge of the compression chamber since the volume of material engaged by these edges will be sufficient to hold the feeder head 24 in substantial expanded position.

To further illustrate the operation of the collapsible feeder head, a modified form has been shown in Figure 8 wherein similar parts have been given similar reference characters. In this embodiment, however, the latching member 53 having a slot and notch 54 cooperating with a rod 48 is connected to a rod 81 which is provided adjacent its upper extremity with a pair of lock nuts 82. The lock nuts 82 engage a lever 83 pivotally mounted on a bracket 84 secured adjacent one side of the side member 28 of the section 25. The outer extremity of the arm 83 is provided with a roller 85 adapted to engage the upper surface of the lever 17. The upper extremity of the other section 34 of the feeder head 24 is engaged by a roller 86 mounted at the end of a bell crank lever 87 resiliently supported from the lever 17. A suitable bolt 88 and a spring 89 provide the resilient connection between the lever 17 and the lever 87. The bolt 88 together with the spring 89 which holds the lever 87 in operative relation to the lever 17 passes through a plate 92 which is secured at right angles to the lever 17. This plate 92 may be secured in any suitable manner although it has been found convenient to do this by welding. As may be seen from Figure 10 adjacent the other end of the lever 87, there is provided an aperture in which there is positioned a square sleeve member 95. A bolt 93 resting upon a washer 94 extends through the sleeve 95 and is secured on the underside of the plate 92 by a nut 96. Preferably the aperture in the plate 92 through which the bolt 93 extends is provided with a certain amount of clearance. Similarly the aperture provided in the lever 87 for receiving a square sleeve 95 also is provided with a certain amount of clearance. This clearance in effect produces a flexible joint so that the lever 87 may move upwardly relative to the plate 92 by a pivotal movement occurring about the rearmost end of the lever 87. Therefore the bolt 93 together with the washer 94, the sleeve 95 and the nut 96 merely serves as a guide means for the rear portion of the lever 97 when this lever is moved against the action of the spring 89. This resilient construction is provided to prevent damage in the event that the member 34 cannot or does not move with exactness to its outward expanded limit.

In the position shown in Figure 8, it may be assumed that the feeder head 24 has reached its uppermost limit of travel and that the roller 86 by engagement with the upper extremity of the section 34 has moved this section to the expanded position so that the latch 53 engages the rod 48 in its notched portion. As the feeder head 24 moves downwardly, the levers 83 and 17 tend to become parallel and eventually the lever 83 is raised by the lever 17 or moved so as to engage the lock nuts 82 so that the rod 81 moves the latching member 53 upwardly so that the rod 48 may operate in the longitudinal slot portion of the aperture 54. When this occurs the two sections 25 and 34 may collapse to assume a position similar to the position shown in Figure 4. From the arrangement of the parts shown in Figure 8, it will be seen that there has again been provided an arrangement for positively moving the feeder head section 34 outwardly to expanded position whereupon it is locked into this position. Subsequently during the downward travel of the feeder head 24 the rod 81 is actuated to disengage the latch and the particular time and cycle of operation may be determined by proper adjustment of the lock nuts 82.

From Figure 7 it will be seen how the guide rail 58 retains in position the plunger 59 without the use of any devices adjacent the top surface of the plunger 59 which otherwise might restrict the opening to the compression chamber. The advantage of this additional space into which to supply a charge of material to the chamber 57 has been found particularly valuable in the case of materials such as soy beans which are being baled for fodder, since the additional area provided in the opening together with the additional area engaged by the expanded feeder head produces a highly desirable operation. The action of the cutter bars 65 and 66 also produces a clean separation between each charge of such material so that when it is desired to open a bale and feed material such as soy beans, it is possible to progressively use the bale without breaking the entire bale and scattering it about prior to obtaining one or two forks of material. In Figure 5 the dotted line representation 91 generally indicates the area of the feeder head 24 when it is substantially in collapsed condition.

To facilitate the understanding of the invention as it would appear in its normal environment in connection with a hay baler or other baler of conventional type, there is shown in Figure 9 the invention as applied to one of the smaller and simpler types of balers. This application to one of the simpler types of balers has been shown in the drawing to facilitate the disclosure although it is to be understood that the present invention is equally applicable to the more complex types of balers including self-powered balers, and pick-up balers.

From the showing in Figure 9 it, therefore, may be assumed that the present invention has been applied to one of the smaller types of balers which is hand fed and which is powered from a suitable auxiliary source of power connected thereto by a belt. Such baler is usually arranged for movement from place to place, and hence is provided with a plurality of wheels 101 mounted on axles which support the frame of the baler. The frame of the baler primarily is delineated by two bottom rails 102 and two top rails 103 each of which more commonly is of angle iron configuration. The top rails 103 and the bottom rails 102 are suitably retained in position by a plurality of top, bottom, and side members, some of which have been omitted from the drawing for the purpose of illustrating more clearly other mechanism. The main baler frame supports at one end a bale case 104 in which the formed bales move toward the exit and in which the ties about the bales are completed by manual operation. Supported at the juncture between the bale case 104 and the main frame is a block holder 105 which is pivotally supported at 100 so that when the block holder is tilted toward the frame, the block held thereby will be in position for engagement by the block engaging member 42 of the feeder head 24.

The main frame supports the upright support members 11 which carry the pair of feeder arm levers 14 and the guide arm lever 23. The collapsible feeder head 24 is supported at the outer extremities of these two sets of pairs of arms. Mounted above the top rail 103 of the baler frame is an auxiliary frame 106 which has a bearing 107 on either side to support a shaft 108 which carries a gear 109. The shaft 108 is provided at one side with a pulley and a fly-wheel not shown in the drawing for purposes of clarity in the disclosure of the other cooperating elements. The gear 109 engages a large gear 111 mounted upon a shaft 112 supported in a bearing 113. The bearing 113 is supported from the auxiliary frame 106. The shaft 112 carries a pair of gears 114 each of which engages one of a pair of large gears 115 which are mounted upon a pair of shafts 116. A crank shaft 110, or an equivalent structure, is mounted between the gears 115 and is connected to one end of the pitman 61 which is connected to a piston 59. At an intermediate point on the pitman there is positioned an upright member 118 which is connected to a short connection link or lever 117, the other end of which is connected to the openings 15 in the lower extremity of the feeder arm levers 14. The material compression chamber 57 is provided adjacent its bottom with a guide member 58 which extends a short distance beyond the end of the compression chamber to retain in engagement the piston or compression plunger 59. Adjacent the upper portion of the compression chamber 57 flared side members including the member 63 are provided to assist the passage of material into the compression chamber.

In the sides beneath the cutting bar or knife 66 are located the dogs 68 which are resiliently biased by springs so that the pointed portions of the dogs extend inwardly into the bale casing through suitable openings or apertures 71. The guide rail 58 mounted in the bottom of the compression chamber 57 terminates in the vicinity of the line interconnecting the extremities of the dogs 68 so that the end of the rail 58 cooperates to retain in position compressed charges of material such as hay or straw.

From the foregoing it will be seen that the application of power to produce the rotation of the large gears 115 brings about movement of the pitman 61 so that as the plunger moves across the opening of the compression chamber 57, the feeder head is moved upwardly. The position of the parts shown in the drawing in Figure 9 is the position obtaining when the compression plunger 59 or piston is being moved rearwardly since the gears 115 are moving in a counter-clockwise direction. Thus the collapsible feeder head 24 has begun its downward movement to engage a charge of material such as hay, straw or the like to be supplied to the compression chamber 57. In view of the detailed description of the operation of the various components comprising the invention, it is believed that it will be apparent to those skilled in the art how the various elements shown in Figure 9 cooperate when applied to a baler.

While for the purpose of illustrating and describing the present invention, certain specific embodiments have been shown in the drawings, it is to be understood that the invention is not to be limited thereby since obviously the invention is susceptible to such other embodiments and variations as may be commensurate with the spirit and scope of the invention as defined in the appended claims.

This invention is hereby claimed as follows:

1. A collapsible feeder head for the compression chamber of a baler, said feeder head having a certain operating cycle and comprising at least two sections, latching means for holding said sections in expanded position for a certain portion of said operating cycle, and means for unlatching said sections at a predetermined time in said operating cycle.

2. A collapsible feeder head for cooperation with the compression chamber of a baler, said feeder head having a certain cycle of operation, said head being formed in at least two sections arranged to be collapsed or expanded, and latching means for said sections having operating means arranged to be actuated at certain times in said cycle of operation, said latching means being operable during one portion of said cycle of operation to latch said sections in expanded position, and operable during the remaining portion of said cycle of operation to permit said sections to be collapsed.

3. In a baler having a compression chamber provided with a reciprocating plunger, a collapsible feeder head having a certain cycle of operation correlated with the operation of said plunger, means interconnecting said head and said plunger, said feeder head having material engaging portions which may be expanded so as to engage material over an extended area, said feeder head having a latching mechanism actuated to latch said portions in expanded position at a predetermined time in said cycle of operation, and means operable to unlatch said portions prior to the withdrawal of said feeder head from said compression chamber.

4. In a baler having a compression chamber provided with a reciprocating plunger, a collapsible feeder head adapted to move in and out of said chamber and having a certain cycle of operation correlated with the operation of said plunger, means interconnecting said head and said plunger, said feeder head having a plurality of material engaging portions adapted to be expanded so as to engage material over an extended area, a latching mechanism for latching said material engaging portions in expanded position at a predetermined time in said cycle of operation, means operable to expand said material engaging portions and to permit said latching mechanism to latch said portions in expanded position, and means subsequently operable to unlatch said portions prior to the withdrawal of said feeder head from said chamber.

5. In a baler, the combination of a compression chamber, a reciprocating plunger for said chamber, a feeder head for forcing material into said chamber for compression by said plunger, means interconnecting said plunger and said head for correlating the movements of said plunger and said feeder head, said feeder head being constructed in a plurality of sections so as to be collapsible, and latching means for holding said sections of said feeder head in expanded position for only a predetermined portion of each downward movement of said feeder head.

6. A collapsible feeder head for the compression chamber of a baler, said feeder head comprising a plurality of sections hingedly interconnected, a pivoted lever supporting said feeder head, a latch member mounted on one of said sections, a cooperating member on the other of said sections, said latch member being arranged to engage said cooperating member to hold said sections in expanded position, and means responsive to a certain position of said lever for unlatching said sections at a predetermined time in the operating cycle of said feeder head.

7. A collapsible feeder head for the compression chamber of a baler, said feeder head being supported by a parallelogram lever mechanism, said feeder head being formed in two pivotally interconnected sections, means providing a certain operating cycle for said mechanism, means for holding said sections in expanded position for a certain portion of said operating cycle comprising a latch member mounted on one of said sections and a cooperating member mounted on the other of said sections, and means actuated by said mechanism for unlatching said sections at a predetermined time in said operating cycle.

8. A collapsible feeder head for the compression chamber of a baler, said feeder head being supported by a parallelogram lever assembly actuated by means adapted to move said feeder head in and out of said compression chamber in a certain operating cycle, said feeder head being formed of two pivotally interconnected collapsible sections, means for holding said sections in expanded position for a certain portion of said operating cycle comprising a latch member mounted on one of said sections and a cooperating member mounted on the other of said sections adapted to be engaged by said latch member thereby to hold said sections in expanded position, means operative to move said sections to expanded position at a predetermined point in said operating cycle, and means for unlatching said sections at another predetermined point in said operating cycle.

9. A collapsible feeder head for the compression chamber of a baler, said feeder head being supported by a parallelogram lever assembly actuated by means adapted to move said feeder head in and out of said compression chamber in a certain operating cycle, said feeder head being formed of two pivotally interconnected collapsible sections, means for holding said sections in expanded position for a certain portion of said operating cycle comprising a latch member mounted on one of said sections and a cooperating member mounted on the other of said sections adapted to be engaged by said latch member thereby to hold said sections in expanded position, means for moving said sections to expanded position at a point in said operating cycle prior to the time when said feeder head is about to engage the material to be moved into said compression chamber, and means for unlatching said sections at a point in said operating cycle while said collapsible feeder head is within the compression chamber of said baler.

10. In a baler, the combination comprising a compression chamber, a reciprocating plunger therefor, a shear bar mounted on the upper edge of said plunger, a cooperating shear bar mounted at the upper edge of said compression chamber, a feeder head for placing a charge of material in said chamber, a separation block engaging member mounted on said feeder head for movement in the proximity of said cooperating shear bar, said separation block engaging member having outwardly flared portions adapted to assist in carrying the charge of material into said chamber and to reduce the thickness of the material to be cut by said shear bars, and actuating means for said plunger and said feeder head.

11. In a baler, the combination comprising a compression chamber, a reciprocating plunger therefor, a shear bar mounted on the upper edge of said plunger, a cooperating shear bar mounted adjacent the upper edge of said compression chamber, a feeder head for placing a charge of material in said chamber, a pivotally mounted separation block engaging member carried by said feeder head, said engaging member having notched and outwardly flared portions for engagement of the material to aid in separating a charge of material so as to reduce the thickness of the material to be cut by said shear bars, and actuating means for said plunger and said feeder head.

LESLIE R. TALLMAN.

REFERENCES CITED

The following references are of record in the file of this patent:

UNITED STATES PATENTS

| Number | Name | Date |
|---|---|---|
| 455,731 | Bates | July 14, 1891 |
| 1,164,992 | Cookson | Dec. 21, 1915 |
| 1,215,014 | Fleming et al. | Feb. 6, 1917 |
| 1,536,562 | Chipman | May 5, 1925 |
| 1,721,906 | Hardman | July 23, 1929 |
| 1,749,509 | Rollman | Mar. 4, 1930 |

FOREIGN PATENTS

| Number | Country | Date |
|---|---|---|
| 525,349 | Germany | May 22, 1931 |
| 9,532 | Great Britain | of 1905 |
| 115,882 | Australia | Sept. 16, 1942 |